United States Patent [19]

Sato et al.

[11] 4,227,222
[45] Oct. 7, 1980

[54] HAND-OPERATED TAPE RECORDER FOR DICTATION

[75] Inventors: Masaaki Sato; Minoru Kobayashi, both of Hachioji, Japan

[73] Assignee: Olympus Optical Company Limited, Tokyo, Japan

[21] Appl. No.: 899,156

[22] Filed: Apr. 24, 1978

[30] Foreign Application Priority Data

| Apr. 25, 1977 | [JP] | Japan | 52-47561 |
| Apr., 1977 | [JP] | Japan | 52-47562 |
| May 6, 1977 | [JP] | Japan | 52-51809 |
| May 6, 1977 | [JP] | Japan | 52-51810 |

[51] Int. Cl.³ .......................................... G11B 15/04
[52] U.S. Cl. ........................................ 360/60; 360/62; 360/137
[58] Field of Search ................... 360/62, 60, 137, 96

[56] References Cited

U.S. PATENT DOCUMENTS

| 3,765,685 | 10/1973 | Harlan | 360/62 |
| 3,766,327 | 10/1973 | Johnson | 360/62 |
| 3,821,800 | 6/1974 | Maltese | 360/62 |
| 3,921,214 | 11/1975 | Nyffeneggek | 360/62 |
| 3,999,446 | 12/1976 | Louzil | 360/62 |
| 4,003,087 | 1/1977 | Iwasaki | 360/62 |

Primary Examiner—John H. Wolff
Attorney, Agent, or Firm—Toren, MacGeady and Stanger

[57] ABSTRACT

A tape recorder for repeatedly recording and stopping a recording tape by switching an operating button as a recording button is locked during a recording state. The recorder includes an engaging member for making the recording button engageable with the recording state and a releasing member for driving the engaging member to release the engagement of the recording state by providing a detection member for detecting the presence of the tape in a tape loading chamber biased to a predetermined direction and by moving the detection member in the biassed direction. The biased force of the detection member is utilized as a pressure force for determining the tape position.

4 Claims, 9 Drawing Figures

HAND-OPERATED TAPE RECORDER FOR DICTATION

BACKGROUND OF THE INVENTION

1. Field of the Invention

The present invention relates to a tape recorder used as, for example, a dictating device.

2. Description of the Prior Art

In recent times, some tape recorders are used as a dictating device.

Such tape recorders are, for the purpose of operating every action with one hand, provided with a recording button 2 operable by an index finger on the side surface of a tape recorder main body 1 as shown in FIGS. 1a and 1b, and an operating button 3 switchable to PLAY, STOP and REW by a thumb, respectively. At the time of recording, the recording button 2 is, firstly, pushed down and, then, the operating button 3 is slid to the PLAY side. In the releasing case, the operating button 3 is slid to the STOP side, the recording button 2 is restored, and the operating button 3 is slid to the PLAY side for reproduction.

According to this method, however, in for instance a dictating device which is used by recording for a short time, stopping for a while to formulate ideas, and recording again, it is very inconvenient to push the recording button 2 whenever recording.

There is a system such that even when the operating button 3 is operated to the STOP side, restoration of the recording button 2 is prevented and repetition of recording and stopping as a dictating device is carried out by only operating the operating button 3.

According to such construction, however, assuming that the operating button 3 is at the STOP position, the condition of the recording button 2 is not confirmed and a cassette tape is loaded as the recording button 2 is in the recording state, and reproduction of the tape is tried; as a result, the content of the tape is erased. Further, even if the operating button is at the STOP position. Accordingly the recording button is not restored, if the operating button 3 is operated toward the REW side for confirming the recorded content and thereafter operated to the PLAY side, the content of the tape is erased.

SUMMARY OF THE INVENTION

An object of the present invention is to eliminate the above mentioned disadvantages of the conventional tape recorder.

Another object of the present invention is to provide a tape recorder in which a recording button is interlocked with the removal of a cassette tape from a cassette chamber and/or operating of an operating button to the REW side whereby the above mentioned tape content is not erroneously erased.

A further object of the present invention is to provide a tape recorder, in which a recording button is interlocked with the removal of a cassette tape from a cassette chamber and/or operating of an operating button to the REW side, whereby the above mentioned tape content is not erroneously erased. The recorder is also provided with pressure force for positioning the cassette tape without using any conventional pressure spring.

According to the present invention, a tape recorder for repeatedly recording and stopping a recording tape by switching an operating button as a recording button is locked under a recording state, comprises an engaging member for making the recording button engageable with the recording state and a releasing member for driving the engaging member to release the engagement of said recording state by providing a detection member for detecting the presence of the tape in a tape loading chamber biased to a predetermined direction and by moving the detection member in the biased direction. The biased force of the detection member is utilized as a pressure force for determining the tape position.

A tape recorder for repeatedly recording and stopping a recording tape by switching an operating button as a recording button is locked in the recording state, comprises an engaging member for engaging the recording button in the recording state, a detection member for detecting presence of the tape in a tape loading chamber, and a releasing member for driving the engaging member to release the engagement of the recording state upon condition of the presence of the tape.

A tape recorder for repeatedly recording and stopping a recording tape by switching an operating button as a recording button is locked under the recording state, comprises an engaging member for engaging the recording button in the recording state, and a releasing member for driving the engaging member to release the engagement of the recording state by interlocking the rewinding operation of the operating button.

A tape recorder for repeatedly recording and stopping a recording tape by switching an operating button as a recording button is locked in the recording state, comprises an engaging member for engaging the recording button in the recording state, a detection member for detecting presence of a lug of the tape in a tape loading chamber, an erroneous erase preventing member for releasing engagement of the engaging member upon condition of absence of the tape, and a member for releasing the engagement of the engaging member by interlocking with the rewinding operation of the operating button.

DESCRIPTION OF THE PREFERRED EMBODIMENT

Figure 1A:
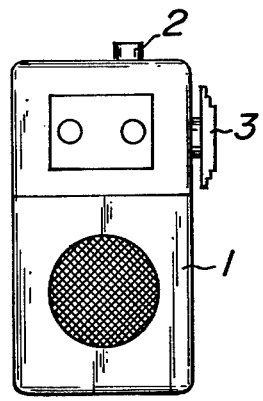
FIGS. 1a and 1b are an elevational view and a side view showing a common tape recorder used, for example, as a dictating device.
Figure 1B:
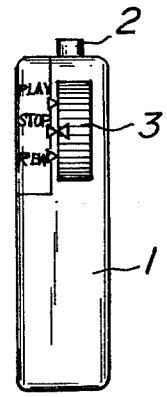
Figure 2A:
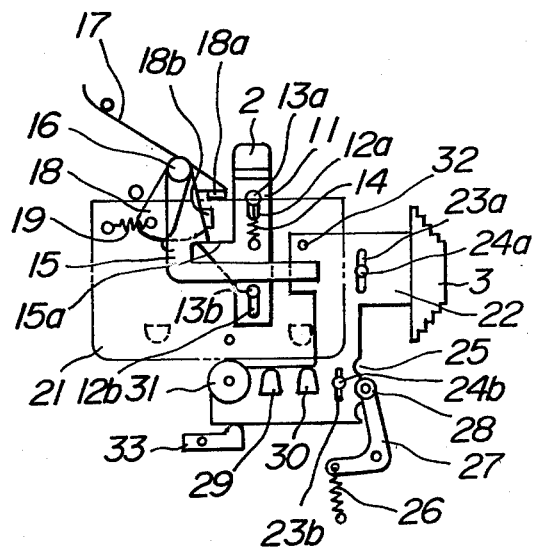
FIGS. 2a, 2b and 2c are schematic plan views showing essential portions of one embodiment of a tape recorder according to the invention, at the time of loading the cassette tape, the time of taking out the cassette tape, and the time of rewinding the tape, respectively.
Figure 2B:
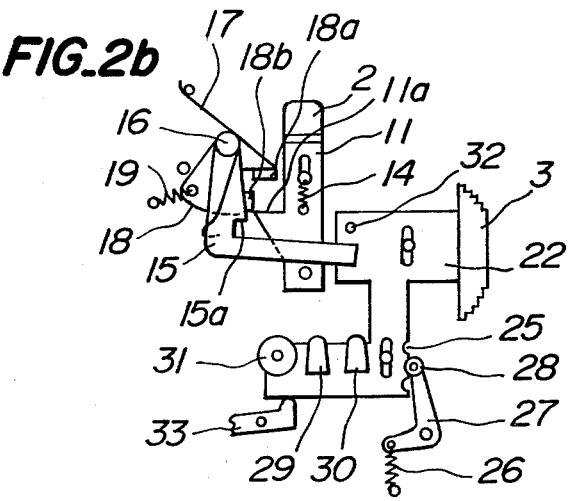
Figure 2C:
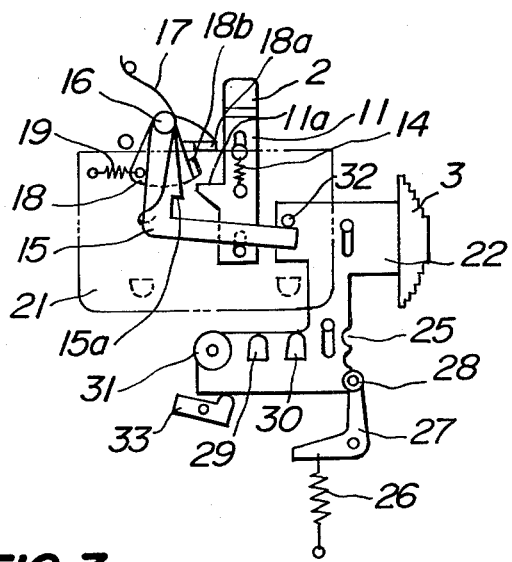
Figure 3:
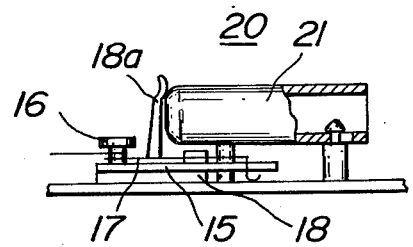
FIG. 3 is an elevational view in section showing the detection member for detecting the presence of the tape in the same embodiment.

Referring now to FIGS. 2a, 2b and 2c, one embodiment of a tape recorder according to the present invention is shown. FIGS. 2a, 2b and 2c show an operation mechanism accommodated in a tape recorder which is explained in FIG. 1. In FIG. 2, reference numeral 11 is a recording lever provided with the aforementioned recording button 2. This lever 11 is provided with elongated holes 12a, 12b on a plate surface. In these elongated holes 12a, 12b are inserted pins 13a, 13b fastened on a chassis (not shown) and freely movable in the push-down direction of the recording button 2. In this case, the recording lever 11 is always biased in the push-up direction, i.e., the restoration direction, by means of a spring 14. The lever 11 is integrally formed with an engaging claw portion 11a at the side periphery.

Reference numeral 15 is an L-shaped engaging lever for engaging the recording lever 11 in the recording state, and the lever 15 is rotatably pivoted by a shaft 16 mounted on the chassis at one end. This lever 15 is always biased in the counterclockwise direction by means of a spring 17 for engaging the engaging claw portion 11a of the recording lever 11 by a step portion 15a.

To the shaft 16 is rotatably secured a releasing lever 18 for releasing engagement of the recording lever 11. This lever 18 is always biased in the clockwise direction by means of a spring 19. This releasing lever 18 is formed with a detection member 18a projected in a chamber 20 of a cassette tape 21. The detection member 18a is for detecting the presence of the cassette tape 21 in the tape chamber 20, presses the back portion of the cassette tape 21 with bias force of the spring 19 and also acts as a pressing spring for positioning a conventional tape position. In this case, in FIG. 2a, there is shown the state of setting the cassette tape 21 in the chamber 20, so that the releasing lever 18 is rotated in the counter clockwise direction against the bias force of the spring 19. The releasing lever 18 is provided with a rising portion 18b for controlling the rotation of the engaging lever 15 in the counter clockwise direction so as to release the engagement of the recording lever 11 by the engaging lever 15 by rotating the lever 18 in the clockwise direction. The bias force of the spring 19 in this case should be larger than that of the spring 14.

Reference numeral 22 is an operating lever provided with the operating button 3, having elongated holes 23a, 23b formed on the plate surface. In these elongated holes 23a, 23b are inserted pins 24a, 24b fastened on the chassis (not shown) and freely movable in the slide direction of the operating button 3. This operating lever 22 forms a click groove 25 corresponding to PLAY, STOP, REW at the side periphery, and clicked at the position of the optional groove 25 by a click roller 28 of a click lever 27 biased in the counterclockwise direction. In this case, FIGS. 2a and 2b show the state of the operating lever 22 set at the STOP position. The operating lever 22 is provided with a recording head 29, an erasing head 30 and a pinch roller 31, and when the operating lever 22 is set at the PLAY position, the recording head 20, the erasing head 30 and the pinch roller 31 are made into contact with the tape surface of the cassette tape 21, respectively.

A pin 32 is planted on the plate surface of the operating lever 22. This pin 32 rotates the engaging lever 15 in the clockwise direction against the bias force of the spring 17 when the operating lever 22 is set at the REW position and releases the engagement of the recording lever 11 by the engaging lever 15.

Moreover, in the figures, reference numeral 33 is a rewind lever which is pushed by the operating lever 22 when the operating lever 22 is set at the REW position and returns the tape under the rewind state.

In such construction, as shown in FIG. 2a now, if the cassette tape 21 is loaded in the cassette chamber 20, the detection member 18a is pushed at the end of the cassette tape 21, the releasing lever 18 is rotated in the counterclockwise direction against the bias force of the spring 19. In this case, the detection member 18a presses the back portion of the cassette tape 21 with the bias force of the spring 19 at a predetermined pressure so that it acts as a pressure spring for positioning the conventional tape position. Further, as the releasing lever 18 rotates in the counterclockwise direction, the engaging lever 15 is also rotated in the counter-clockwise direction by the bias force of the spring 17 until it makes contact with the rising portion 18a.

In such state, if the recording button 2 is pushed and the lever 11 is moved in the push-down direction, the engaging claw portion 11a is engaged with the step portion 15a of the engaging lever 15. Accordingly, if the operating button 3 is slid from this state to the PLAY side, it becomes the recording state, while when the operating button 3 is slid to the STOP side, its recording is stopped. In this case, even if the operating button 3 is moved back from PLAY to STOP, the recording lever 11 is still engaged with the engaging lever 15, so that the repetition of the optimum recording and stopping as a dictating device can be carried out by means of the operating button 3 thereafter.

Next, when the cassette tape 21 is taken out of the cassette chamber 20, the releasing lever 18 is rotated in the clockwise direction by the spring 19 as shown in FIG. 2b. Further, by the rotation of the releasing lever 18 in the clockwise direction, the engaging lever 15 is also rotated in the clockwise direction against the spring 17 by means of the rising portion 18a. Whereby, engagement of the engaging claw portion 11a of the recording lever 11 and the step portion 15a of the engaging lever 15 is released and the recording lever 11 is restored by means of the spring 14. Therefore, assuming that the operating button 3 is at the STOP position, even if the recording button 2 is not confirmed and the cassette tape 21 is exchanged, the recording button 2 can be restored by interlocking this removal of the cassette tape 21, so that the content of a tape newly loaded thereafter is not erroneously erased and such disadvantage is prevented.

In order to rewind the tape for reproducing the content of a tape, the operating button 3 is slid to the REW side. Then, as shown in FIG. 2c, the engaging lever 15 is rotated in the clockwise direction against the bias force of the spring 17 by the pin 32 of the operating lever 22. Therefore, when the recording button 2 is set in the recording state, the engagement of the recording lever 11 is released and restored. Further, the rewind lever 33 is pushed at the end of the operating lever 22 and the tape is back to the rewinding state. Then, after rewinding the tape to the necessary portion and the operating button 3 is slid to the STOP side, the rewinding is stopped, and thereafter if the button is slid to the PLAY side, the recorded content can be reproduced.

Figure 4A:
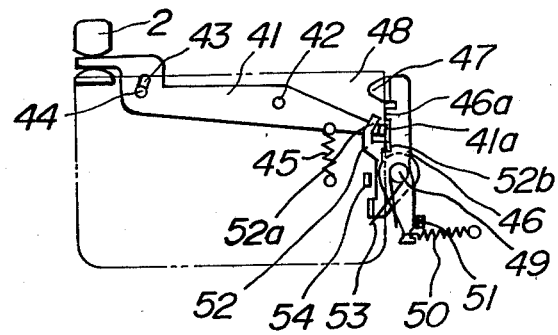
FIGS. 4a, 4b and 4c are schematic plan views showing essential portions of another embodiment of a tape recorder according to the invention, at the time of loading the cassette tape including a bent lug, the time of loading the cassette tape including a lug, and the time of engaging the recording button, respectively.
Figure 4B:
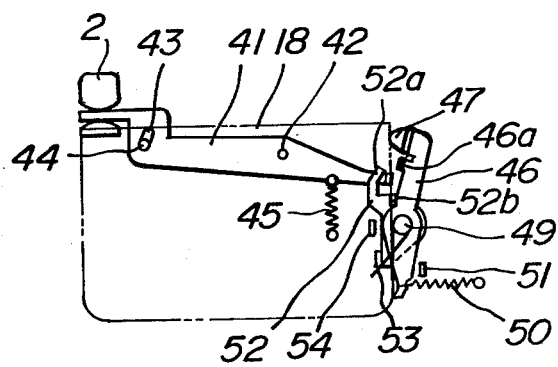
Figure 4C:
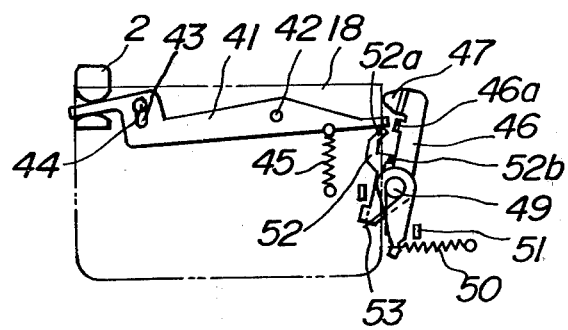

Another embodiment of the invention will be explained hereinafter. FIGS. 4a, 4b and 4c show an operating mechanism of the tape recorder shown in FIG. 1. In FIG. 4, reference numeral 41 is a recording lever secured to one end of the aforementioned recording button 2, and the recording lever 41 is rotatably pivoted by a shaft 42. Further, an elongated hole 43 is formed on the plate surface at one end portion of the lever 41. In the elongated hole 43 is inserted a pin 44 fastened on the chassis (not shown), and the recording button 2 is movable in the vertical direction by a predetermined distance. In this case, the recording lever 41 is biased in the clockwise direction by a spring 45 constantly. Further, the lever 41 is formed with a rising portion 41a at the other end.

Reference numeral 46 is an erroneous erase preventing lever, and this lever 46 is provided with a plastic projection 47 for detecting a lug (not shown) of a cassette tape 48, and at the lower portion of this projection 47 is provided a small projection 46a for controlling movement of the recording lever 41. Further, the lever 46 is rotatably pivoted by a shaft 49, biased in the counterclockwise direction by a spring 50 and made into contact with a stopper 51 constantly.

To the shaft 49 is rotatably secured an engaging lever 52 for engaging the recording lever 41 under the recording state and always biased in the clockwise direction by a spring 53. The lever 52 is formed with an engaging portion 52a for engaging the rising portion 41a of the recording lever 41 at one end and provided with a rising portion 52b contacted with the erroneous erase preventing lever 46 on the way of the lever 52. Accordingly, the lever 52 is rotated together with the erroneous erase-preventing lever 46.

Reference numeral 54 is a projection of an operating lever (not shown) slid in the vertical direction by interlocking with the slide operations of PLAY, STOP and REW of the operating button 3, and the projection 54 is rotated in the counterclockwise direction against the bias force of the spring 53 when the operating button 3 is slid to the REW side.

In such construction, in the case of loading a cassette tape 48 which lug is bent as shown in FIG. 4a (or in the case of not loading a cassette tape), the erroneous erase-preventing lever 45 is rotated in the counterclockwise direction until it makes contact with the stopper 51 by the spring 50. Accordingly, when the recording button 2 is pushed under such state, the recording lever 41 is to rotate in the counterclockwise direction, but its rising portion 41a is made into contact with the projection 46a of the lever 46, so that more movement of the recording button 2 is checked and recording operation becomes impossible.

Then, in the case of loading the cassette tape 48 having a lug as shown in FIG. 4b, the erroneous erase-preventing lever 46 is rotated in the clockwise direction against the spring 50 because the projection 47 is made into contact with the lug portion of the cassette tape 48. When the recording button 2 is pushed in this state, the rising portion 41a of the recording lever 41 does not make contact with the projection 46a of the lever 46, so that the recording lever 41 is rotated in the counterclockwise direction against the spring 45 in accordance with the push-down of the recording button 2. Further, when the recording lever 41 is rotated by a predetermined angle, the rising portion 41a is engaged by the engaging portion 52a of the engaging lever 52 as shown in FIG. 4c. Therefore, if the operating button 3 is slid from this state to the PLAY side, it becomes the recording state, while it is slid to the STOP side, the recording is stopped. In this case, even if the operating button 3 is back from the PLAY side to the STOP side, the recording lever 41 is still engaged, so that the repetition of the optimum recording and stopping as a dictating device can be carried out only by the operating button 3 thereafter.

When the cassette tape 48 is taken out of the cassette chamber, the erroneous erase-preventing lever 46 is rotated in the counterclockwise direction until it makes contact with the stopper 51 by the spring 50. Then, by this rotation of the erroneous erase-preventing lever 46, the engaging lever 52 is also pushed by the rising portion 52b and rotated in the counter clockwise direction, so that the engagement of the rising portion 41a of the recording lever 41 by the engaging portion 52a is released and the recording lever 41 is restored by the spring 45. Therefore, if the oeprating button 3 is at the STOP position, even if the state of the recording button 2 is not confirmed and the cassette tape 48 is exchanged, the recording button 2 is restored by interlocking with the cassette tape 48, and as a result, the content of the tape newly loaded thereafter is prevented from erroneous erasing.

Further, as shown in FIG. 4c, when the recording lever 41 is slid from the state of engagement under the recording state and is operated to slide the operating button 3 to the REW side for reproducing the content of the tape, the projection 54 is made into contact with the engaging lever 52 for rotating the lever 52 in the counterclockwise direction against the spring 53.

Accordingly, in the same manner as described above, the engagement of the rising portion 41a of the recording lever 41 by the engaging portion 52a is released and the recording lever 41 is restored by the spring 45. Further, the tape can be put back to the rewinding state by the operation of the operating button 3 to the REW side. After the tape is rewound to the necessary portion, if the operating button 3 is slid to the STOP side, the rewinding is stopped and thereafter, if the tape is slid to the PLAY side by the operating button 3, the recorded content can be reproduced.

As described above, according to the present invention, the cassette tape can be taken out of the cassette chamber or the recording button can be restored by interlocking with the operation of the REW side, so that the present invention can positively remove such disadvantage that the operating button is imagined to be at the STOP position and the state of the recording button is not confirmed, but a new cassette tape is loaded in the recording state, the tape is reproduced, and the content of the tape is erroneously erased as in the prior device. Moreover, the present invention can remove the disadvantage occuring when the operating button is operated to the REW side for listening to the recorded content and thereafter operated to the PLAY side and the content of the tape is erroneously erased. Further, the pressure force for positioning the position of the cassette tape can be obtained from the bias force of the detection member, thereby omitting the prior pressure spring, which results in economic advantage.

The present invention is not limited to the above embodiments but can be properly modified within the true spirit and scope of the invention without changing the essential features.

What is claimed is:

1. A tape recorder for repeatedly recording and stopping a recording tape by switching an operating button as a recording button is locked in a recording state, comprising:

an operating button for controlling the mode of operation of the recorder and adapted to being switched between a play mode, a stop and a rewind mode;

a recording button for placing said recorder in a recording state;

a recording member connected to the recording button;

an engaging member for engaging said recording member for locking said recording button in the recording state of the recorder;

an erroneous erase-preventing member for releasing engagement of the engaging member upon the condition of the absence of a tape cassette in a tape loading chamber; and an operating lever member for releasing the engagement of the engaging member, said member responsive to switching of the operating button to the rewind mode.

2. The recorder of claim 1, wherein said erroneous erase-preventing member includes a detection portion for detecting a lug of a cassette tape.

3. The recorder of claim 2, wherein said recording member includes a projection portion, wherein said engaging member has a portion which cooperates with said recording member projection, wherein a shaft is included on which said engaging member can pivot and wherein said erroneous erase-preventing member is also rotatably secured to said shaft.

4. The recorder of claim 1, also including biasing means for biasing said erroneous erase-preventing member to a predetermined direction, biasing force of said biasing means being utilized as a pressure force for establishing tape cassette position.

* * * * *